Oct. 30, 1956
E. A. STRID
2,768,570
MACHINE FOR CUTTING SOD PLUGS
Filed April 14, 1955
3 Sheets-Sheet 1
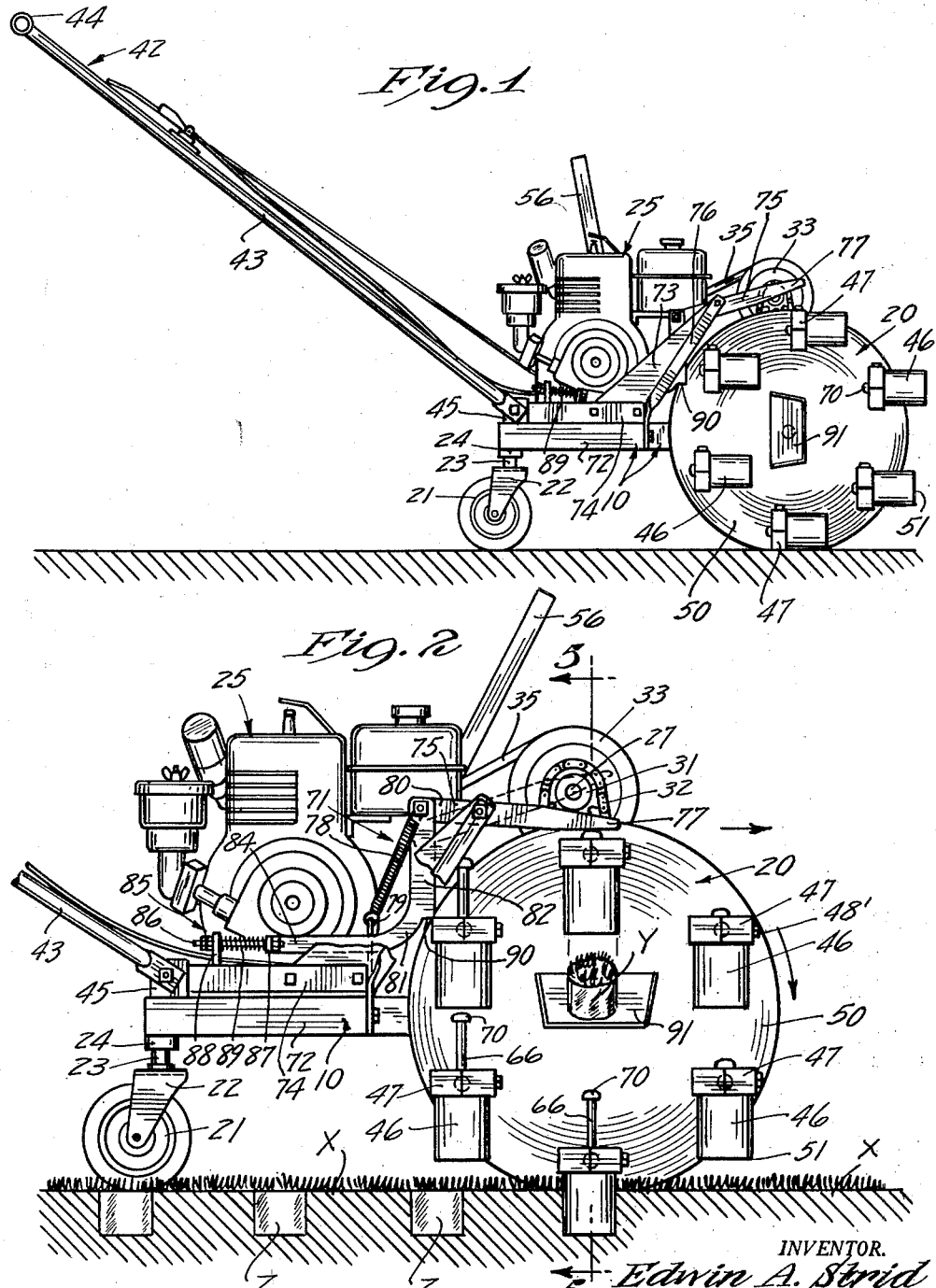
INVENTOR.
Edwin A. Strid
BY
Merchant & Merchant
ATTORNEYS Oct. 30, 1956  E. A. STRID  2,768,570
MACHINE FOR CUTTING SOD PLUGS
Filed April 14, 1955  3 Sheets-Sheet 2

INVENTOR.
Edwin A. Strid
BY
Merchant & Merchant
ATTORNEYS

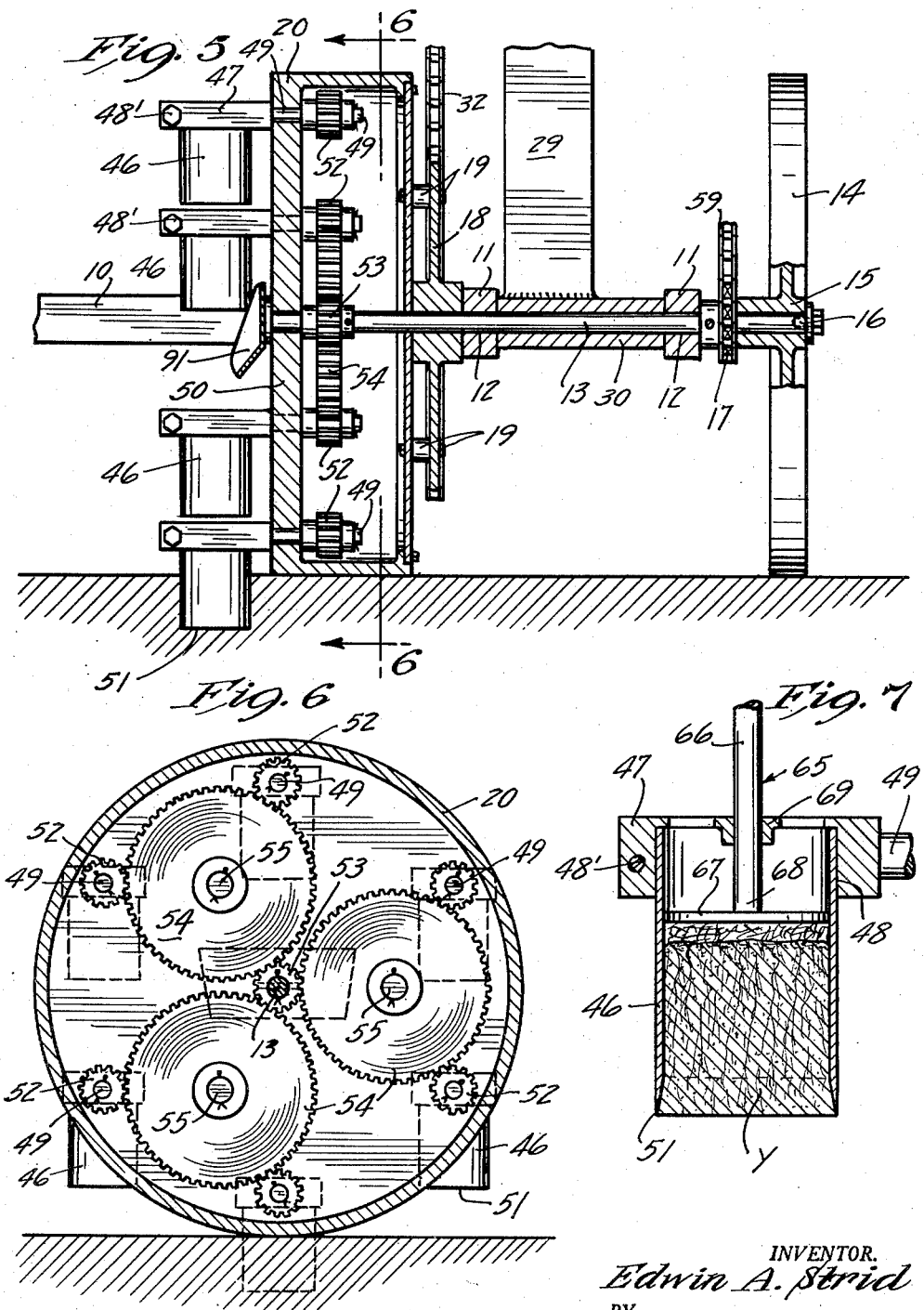

United States Patent Office

2,768,570
Patented Oct. 30, 1956

2,768,570

MACHINE FOR CUTTING SOD PLUGS

Edwin A. Strid, Minneapolis, Minn.

Application April 14, 1955, Serial No. 501,300

13 Claims. (Cl. 97—22.6)

My invention relates to a machine for cutting sod plugs.

An object of my invention is to provide a machine which is adapted for wheeling movements over sod and simply and quickly cuts and removes from the ground a plurality of sod plugs suitable for transplanting and which simply and quickly digs a plurality of spaced sod plug holes in a lawn to be treated, wherein the previously-cut sod plugs may be quickly and easily placed in the lawn to be treated without affecting the appearance thereof and in a minimum of time.

I provide, in a machine of the class described, a cylindrical ground-engaging drum-like member adapted to roll over the sod during wheeling movements of the machine, and a plurality of circumferentially spaced digger elements carried by the drum-like member, which digger elements cut a plug of sod and carry the same upwardly from the ground during rotation of the drum-like member.

Another object of my invention is to provide, with the machine aforesaid, means for maintaining the digger elements in operative vertical positions during their rotation with the drum-like member when my machine is being used to dig sod plugs to be transplanted or to dig sod plug holes in the lawn to be treated, and to provide means for moving the digger elements from their operative vertical positions to inoperative positions and to maintain them at their inoperative positions during rotation of the drum-like member, wherein the digger elements at their inoperative positions will not engage the ground at times when it is desired to move my machine but it is not desirable to dig or mar the lawn over which the machine may be moved and at times when the machine may be moved over a generally hard unpenetrable surface, such as a sidewalk or roadway.

Another object of my invention is to provide means for automatically ejecting the dug sod plug from the digger elements during their rotation with the drum-like member so that each digger element is free to dig and take from the ground a different sod plug during each cycle of rotation of the drum-like member.

Another object of my invention is to provide, in a machine of the class described and having the automatic ejector of the aforementioned object, means for directing the ejected sod plugs laterally beyond the path of movement of the machine so that the sod plugs which are to be transplanted will not be crushed by my machine during its operation.

A further object of my invention is to provide a machine of the class described which is simply and effectively operated, and which is of simple and durable construction.

These and other objects and advantages of my invention will become apparent in the course of the following specification and claims, reference being had to the accompanying drawings wherein:

Fig. 1 is a view in side elevation of my invention;

Fig. 2 is an enlarged view in elevation of the same side of my invention as shown in Fig. 1 with some of the parts in different positions, some parts being broken away;

Fig. 5 is an enlarged view partly in vertical section and partly in elevation taken substantially on the line 5—5 of Fig. 2;

Fig. 6 is a view partly in vertical section and partly in elevation taken on the line 6—6 of Fig. 5; and Fig. 7 is a detailed view in axial section of one of the digger elements of my invention.

Figure 3:
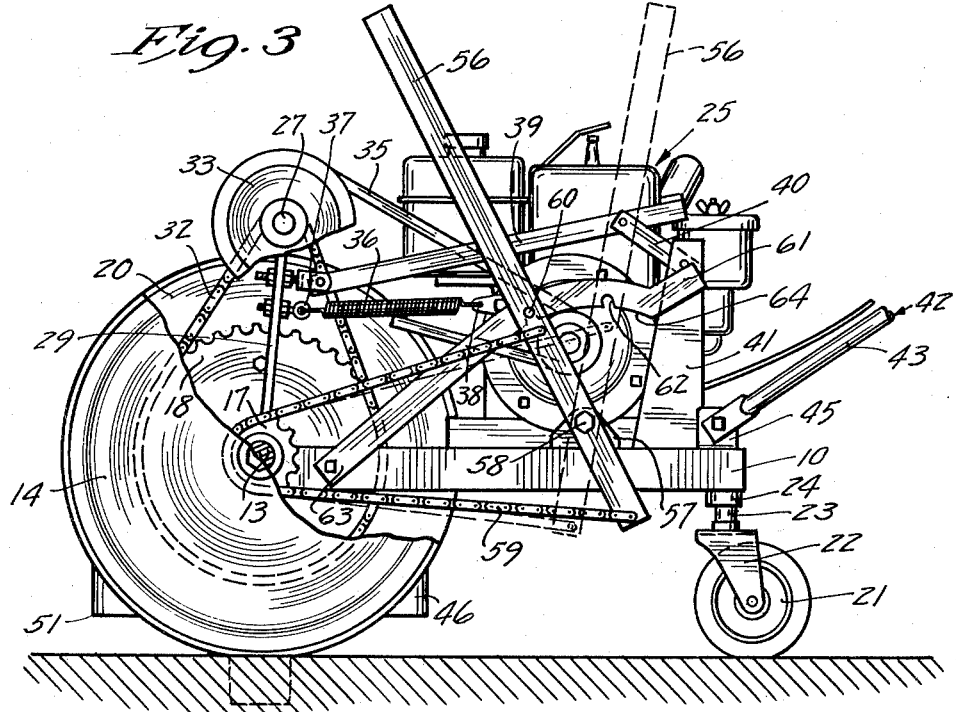
Fig. 3 is a view in elevation on the same scale as Fig. 2 from the other side of the structure shown in Fig. 2, some parts being broken away.
Figure 4:
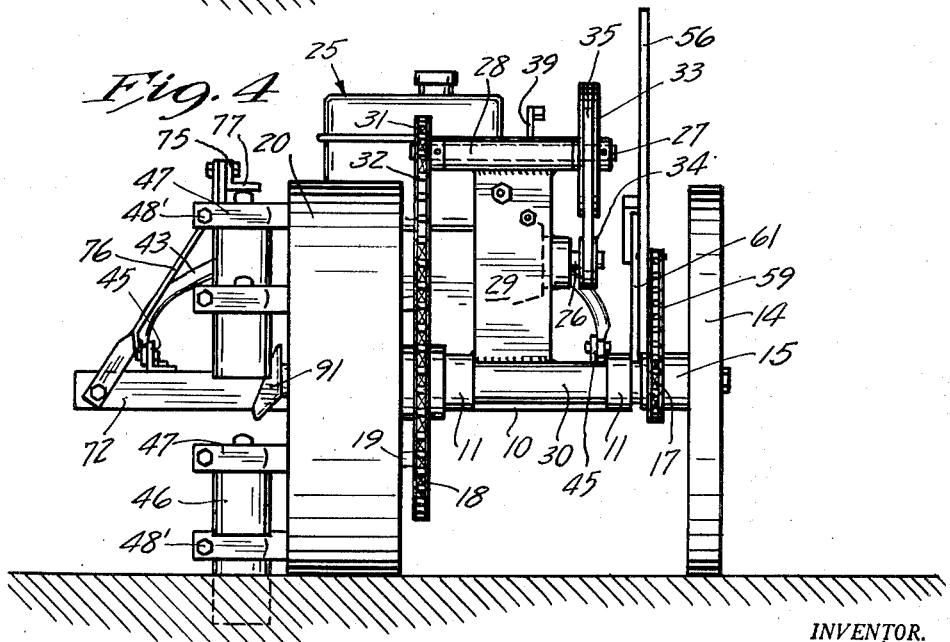
Fig. 4 is a view in front elevation of my invention on the same scale as Fig. 2.

Referring more particularly to the drawings, wherein like parts will be indicated by the same numeral, my novel and improved machine for cutting sod plugs comprises a horizontally disposed frame 10 which is bifurcated at its forward end to form laterally spaced bearings 11. Bearings 11 have aligned apertures 12 formed therein to receive and journal a horizontally disposed shaft 13, which extends laterally beyond the forward end portion of frame 10 on both sides thereof. A wheel 14 has a hub 15 journalled on end 16 of shaft 13 for rotation with respect thereto. A sprocket wheel 17 is rigidly connected to shaft 13 adjacent its end 16 between hub 15 and one of the bearings 11. Journalled on shaft 13 adjacent the other bearing 11, laterally outwardly thereof, is a sprocket wheel 18. Rigidly connected to sprocket wheel 18 for rotation therewith by means of spaced bolts and spacers, indicated together by the numeral 19, is a cylindrical ground-engaging drum-like member 20 journalled on shaft 13 for rotation with respect thereto in concentric relationship therewith. A ground-engaging caster wheel 21 is mounted by bifurcated bracket 22 for rotational movement about a horizontal axis; and upstanding spindle 23, rigidly secured to bracket 22, is journalled for pivotal swinging movements about a vertical axis in the bearing 24 fixedly connected at the rearward end of frame 10. Caster wheel 21, drum-like member 20 and wheel 14 mount frame 10 for wheeling movements.

My machine is adapted to be motor-driven; and I provide a gasoline engine, indicated in its entirety by the numeral 25, which is rigidly mounted on frame 10 and has a drive shaft 26. I provide a drive train between shaft 26 and sprocket wheel 18 comprising a shaft 27 journalled for rotation in upwardly spaced parallel relationship with shaft 13 by sleeve 28. Sleeve 28 is rigidly connected by welding or the like to a web 29 which, at its opposite end, is rigidly connected, by welding or the like, to a sleeve 30. Sleeve 30 is journalled on shaft 13 for rotation with respect thereto between the bearings 11. A sprocket wheel 31 is rigidly connected to one end of shaft 27 and is in driving engagement with sprocket wheel 18 through continuous chain 32. A pulley 33 is rigidly connected to the opposite end of shaft 27. A pulley 34 is rigidly connected to drive shaft 26 and an endless drive belt 35 runs over pulleys 34 and 33. I provide clutch means for pivotally swinging web 29 and therewith pulley 33 toward and away from pulley 34 about the axis defined by shaft 13 which loosens and tightens belt 35 to place pulleys 33 and 34 into and out of driving relationship respectively. This clutch means comprises a coiled tension spring 36 connected at one end 37, by any suitable means, to web 29 intermediate sleeves 30 and 28 and connected at its other end 38, by any suitable means, to the motor 25 adjacent drive shaft 26 for yieldably urging web 29 and shaft 28 toward drive shaft 26, and thereby moving pulley 33 toward pulley 34 and out of driving relationship therewith. Web 29 is pivotally moved about the axis defined by shaft 13 away from drive shaft 26 against the bias of spring 36, by pivotally connected toggle links 39 and 40 movable between a released angular position, shown in Fig. 3, and a set, over-dead-center, substantially aligned position. Toggle link 40 is pivotally connected, at the end thereof opposite its connection to pivotal link 39, to the upper end of an upstanding fixed supporting member 41, which is rigidly secured to the frame 10 rearwardly of shaft 26; and toggle link 39 is pivotally connected, at the end thereof opposite its pivotal connection to link 40, to web 29, by any suitable means. When toggle links 39 and 40 are in their angular released position spring 36 maintains pulleys 33 and 34 out of driving relationship; and the movement of toggle links 39 and 40 from their released position to their set generally aligned position moves web 29 and shaft 28 about their pivotal axis generally away from drive shaft 26 and maintains pulleys 33 and 34 in driving relationship.

Drive shaft 26 drives sprocket wheel 18 and therewith drum-like member 20 through the aforementioned drive train, when pulleys 33 and 34 are in driving relationship, in the direction indicated by the arcuate arrow adjacent drum-like member 20 in Fig. 2 which motivates my machine for forward movement. I provide a generally upwardly and rearwardly extending handle, indicated in its entirety by the numeral 42, comprising a pair of laterally spaced elongated arms 43 and a cross member 44 rigidly connected to the upper ends of arms 43. Arms 43 are connected at their lower ends to laterally spaced upstanding ears 45 by bolts or the like. Ears 45 are rigidly fixed to the frame 10 at the rearward end thereof. Caster wheel 21 permits the operator to guide the direction of forward movement through lateral movements of the handle 42.

I provide a plurality of tubular digger elements 46, each of which is releasably engaged by a split annular head 47, having a slit extending from the outside generally rectangular surface to the internal generally cylindrical bore 48. Threaded bolts 48' tie the split portions of the heads 47 together and fixedly secure the heads 47 each at one end of a different one of the tubular digger elements 46. Heads 47 have laterally outwardly extending digger shafts 49 rigid therewith which are disposed generally at right angles to the axis of the associated digger element 46. Shafts 49 are journalled in an end wall 50 of drum-like member 20 in circumferentially spaced relationship for rotation therewith about the axis of rotation of drum-like member 20 and for rotation with respect thereto, each shaft 49 about its own axis. Shafts 49 are horizontally disposed; and digger elements 46 and their associated heads 47 are disposed laterally outwardly of end wall 50. Digger shafts 49 are journalled in end wall 50 radially inwardly from the periphery thereof a distance less than the axial distance from the shafts 49 to the outer ends 51 of digger elements 46 so that when digger elements 46 are vertically disposed, as shown in Fig. 2, they will project downwardly beyond the ground-engaging periphery of drum-like member 20 and enter the ground or sod, indicated by the letter X.

Shaft 13 is maintained relatively fixed with respect to drum-like member 20 during the rotation thereof; and I provide gearing between shaft 13 and digger elements 46 for rotating digger elements 46 about their connection to end wall 50 in a direction opposite to the direction of rotation of drum-like member 20 for maintaining the axes of the digger elements 46 extending in fixed specific directions during the rotation of drum-like member 20. Preferably, the aforementioned gearing comprises a plurality of digger gears 52 which are rigidly anchored each to a different one of the digger shafts 49, adjacent the laterally outwardly disposed ends thereof with respect to heads 47 and within drum-like member 20 on the opposite side of end wall 50 from heads 47. A shaft gear 53, which is of the same size and number of teeth as gears 52, is rigidly connected to shaft 13 for rotation therewith radially inwardly from gears 52 and in common vertical planes therewith. I preferaly provide several intermediate gears 54 journalled on stub shafts 55 which are fixedly secured to drum-like member 20 and project laterally inwardly from end wall 50 thereof, for rotation with respect to drum-like member 20 about horizontal axes in circumferentially spaced relationship radially inwardly of digger shafts 49 and radially outwardly of shaft 13. Intermediate gears 54 are in mesh with shaft gear 53 and digger gears 52. Referring in particular to Fig. 6, I have provided six uniformly circumferentially spaced digger gears 52 and three intermediate gears 54; each of the intermediate gears 54 is in mesh with two adjacent digger gears 52 and the shaft gear 53. Other gearing between shaft 13 and digger gears 52 than that specifically shown could be provided; and for example, digger gears 52 might be connected together for common rotation by an endless chain and one of the digger shafts 49 could be in driving engagement with shaft 13 through sprockets and a drive chain or other suitable driving connection.

The circumferential disposition of digger elements 46 about their own axes of rotation defined by shafts 49 is dependent upon the position of shaft 13 with respect to frame 10. I provide means for selectively rotating shaft 13 with respect to frame 10 alternately in opposite directions between two positions, which shall be defined as the operative position of shaft 13 and the inoperative position of shaft 13. At the operative position of shaft 13 digger elements 46 are maintained in the vertically disposed operative positions shown in Fig. 2 during the rotation of drum-like member 20 and at the inoperative position of shaft 13 digger elements 46 are maintained in inoperative generally horizontal positions, shown in Fig. 1, during rotation of drum-like member 20. The means for selectively rotating shaft 13 comprises an elongated lever arm 56 pivotally connected intermediate its ends to upstanding ear 57, which is rigidly secured to frame 10, for pivotal swinging movements about the horizontal axis indicated by the numeral 58. Means connecting lever arm 56 to shaft 13 for rotating the latter with respect to frame 10 comprises sprocket wheel 17 and a chain 59 running over sprocket 17 and connected at its opposite ends to lever arm 56 on opposite sides of the pivotal axis 58 thereof. Lever arm 56 has a laterally inwardly projecting pin 60 connected thereto upwardly spaced from the pivotal axis 58 thereof. A locking bar 61 has a pair of spaced notches 62 formed in an arcuate intermediate portion thereof which receives the pin 60 to maintain lever arm 56 in the positions shown in full and dotted lines in Fig. 3. Locking bar 61 is pivotally connected at its end 63 adjacent the forward end of frame 10 for pivotal swinging movements about its connection to frame 10; and it extends generally upwardly and rearwardly from its connection with frame 10 to dispose the arcuate intermediate portion thereof generally vertically upwardly of the pivot axis 58 of lever arm 56. Locking bar 61 engages pin 60 in the notches 62 to hold lever arm 56 against pivotal movement and in the proper position for maintaining shaft 13 at either its operative position or its inoperative position. Pivotal upward movement of locking bar 61 moves pin 60 relatively out of one of the downwardly opening notches 62 which permits lever arm 56 to be moved about its pivotal axis 58 either from its full line position to its dotted line position, Fig. 3, or vice versa. During movement of lever arm 56 between its two positions, pin 60 rides along the arcuate edge portion 64 of locking bar 61, between notches 62, until pin 61 reaches one of the notches 62 and then locking bar 61 will move downwardly and pin 60 will move into the notch to lock lever arm 56 in position.

I provide a plurality of piston and plunger rod assemblies 65 each of which comprises plunger 66 and a piston 67 integrally formed with or rigidly connected, by welding or the like, to end 68 of plunger 66. Each of the assemblies 65 is mounted in a different one of the digger elements 46 for limited axial movements. Each of the plungers 66 is journalled by a spider 69 rigidly secured to the end of the associated digger element 46 adjacent head 47. Plungers 66 are are movable between extended and retracted positions with respect to their associated digger elements 46 and each has a protuberance 70 formed at its end, opposite end 68 axially outwardly of the associated head 47. Protuberances 70 engage spiders 69 at the maximum retracted position of plungers 66, at which position the pistons 67 are disposed adjacent ends 51 of digger elements 46. Ends 51, see particularly Fig. 7, slope radially outwardly so that tubular digger elements 46 have a sharp ground-engaging edge. Referring in particular to Fig. 2, just before each of the digger elements 46 enters the ground or sod X, the plunger 66 therein is at its retracted position; as the digger element 46 enters the ground, the sod plug Y encompassed and cut thereby pushes upwardly against piston 67 and moves plunger 66 from its retracted position to the extended position of Fig. 7. It is clear that the sod plug Y may be easily ejected by moving the plunger 66 from its extended position back to its retracted position, whereby piston 67 pushes sod plug Y out of the digger element 46. I provide an ejector mechanism, indicated in its entirety by the general reference numeral 71, for consecutively engaging each of the plungers 66 for moving one of them from its extended position to its retracted position during each operation thereof. Frame 10 is substantially L-shaped and has a laterally outwardly projecting portion 72 adjacent its rearward end. Ejector mechanism 71 comprises an upright forwardly inclined mounting member 73 which is rigidly secured, by bolts or the like, at its lower end to an angle iron 74, which in turn is rigidly bolted to laterally projecting end portion 72 of frame 10. A generally horizontally disposed ejector arm 75 is pivotally connected intermediate its ends to the upper end of mounting member 73 for pivotally swinging movements about a horizontal axis. A rigid supporting strut 76 is connected at one end to portion 72 of frame 10 and at its opposite end to the upper end of mounting member 73. The forward end 77 of ejector arm 75 overlies the path of travel of digger elements 46 and the path of travel of plungers 66 at a place adjacent the peak thereof, or at what might be termed a "twelve o'clock" position. Forward end 77 of ejector arm 75 is periodically generally vertically reciprocally movable between a potential-sod-ejecting position, shown in dotted lines in Fig. 2, and an effectuated-sod-ejecting position, shown in full lines in Fig. 2. During the generally vertically downward movements of forward end 77 from its potential-sod-ejecting position to its effectuated-sod-ejecting position, end 77 engages the plunger 66 disposed beneath it, at the aforementioned twelve o'clock position, to move this plunger from its extended position to its retracted position. Resilient means comprising a coiled tension spring 78 is connected at one end to a lug 79, which is rigidly secured to the frame 10, and at its opposite end is connected to the rearward end 80 of ejector arm 75 to urge the latter to its potential-sod-ejecting position. Ejector mechanism 71 further comprises actuating means in the nature of an L-shaped control arm 81 for periodically moving ejector arm 75 from its potential-sod-ejecting position, against the bias of spring 78, to its effectuated-sod-ejecting position as each plunger 66 passes the twelve o'clock position of its cycle of operation. Control arm 81 has an upright portion 82 pivotally connected adjacent its upper end to the rearward end 80 of ejector arm 75. The generally horizontally disposed portion 84 of control arm 81 connects the lower end of upright portion 82 to frame 10 through flexible connecting means, indicated generally by the numeral 85, for limited pivotal movements about its pivotal connection to end 80 of ejector arm 75 and for generally vertical movements with respect to frame 10. Flexible connecting means 85 comprises a pin or rod 86 extending through an aperture formed in a laterally disposed end portion 87 of portion 84 and an aperture or slot formed in upstanding lug 88, which is rigidly secured by welding or the like to angle iron 74. Pin 86 has nuts at its opposite ends to hold lug 88 and end portion 87 on that portion of the pin 86 therebetween for limited movement of end 87, and thereby control arm 81, toward and away from lug 88. A compression spring 89 between lug 88 and the end portion 87 urges the latter to its limit of movement on pin 86 away from lug 88. The aperture in lug 88 through which rod or pin 86 extends is large enough to permit vertical rocking movements of pin 86 with respect to frame 10 and this permits the aforementioned flexibility of movement of control arm 81. Control arm 81 defines an abutment or shoulder 90 adjacent the intersection of generally upright portion 82 and generally horizontal portion 84 thereof.

Springs 78 and 89, the former urging control arm 81 generally downwardly and the latter urging control arm 81 generally forwardly, cooperate to dispose the floating control arm 81 so that abutment 90 is disposed in the path of travel of heads 47 to be periodically engaged by each of the heads 47 at a place in the latter's cycle of rotation between the place where its associated digger element 46 leaves the ground and its associated plunger 66 is engaged by ejector arm 75.

I provide a chute, indicated by the numeral 91 which is rigidly connected to the end flange 92 of shaft 13. Chute 91 is disposed at the operative position of shaft 13 to define an upwardly opening downwardly sloping channel directly beneath the digger element 46, which is at the twelve o'clock position and at which position the sod plug Y is ejected from each of the digger elements 46. Because chute 91 is connected to shaft 13, it will not rotate during the operation of my machine but will always be in position to receive the ejected sod plugs as they are pushed out of the digger elements 46 by the operation of the ejector mechanism 71. Referring to Fig. 1 it is clear that chute 91 will be rotated with shaft 13 to a rearwardly facing position when digger elements 46 are moved to their generally horizontally disposed inoperative positions. Chute 91 directs the ejected sod plugs laterally outwardly which insures that the plugs Y will not be crushed under the wheels of my machine during its operation.

When it is desired to transplant plugs of sod from one lawn to another, such as is the usual practice in the development of a lawn of creeping bent grass, my machine is run over a bent grass lawn or sod with the digger elements 46 in their vertically disposed operative position. As each of the tubular digger elements 46 enters the ground or sod X, cutting end 51 entering first, it cuts a circular plug Y of sod and carries the same upwardly from the ground. During the upward movement of each of digger elements 46, the head 47 thereof engages abutment 90, at generally a place intermediate nine and ten o'clock of a cycle of rotation, which moves upright portion 82 of control arm 81 generally vertically upwardly which moves forward end 77 of ejector arm 75 generally vertically downwardly to move the plunger 66 associated with the next adjacent digger element 46, in a clockwise direction, to its retracted position. This ejects the sod plug Y which is received in the chute 91 and directed laterally outwardly to the ground. After the desired number of sod plugs Y have been cut and dug, they may be collected from the ground and taken with my machine to the lawn to be treated. My machine is then run over the lawn to be treated to dig suitably spaced sod plug holes, Z. The previously dug plugs Y of bent grass sod are then placed in the holes Z of the lawn to be treated.

My novel and proved machine has been built and tested and found to accomplish all of the aforementioned objectives and advantages. Although I have herein specifically disclosed a preferred commercial embodiment of my invention, it will be obvious to those skilled in the art that my machine may be modified by many substitutions and equivalents and that this disclosure is intended to be illustrative only; therefore, I intend to be limited solely by the scope of the appended claims.

What I claim is:

1. In a machine for cutting sod plugs, a wheeled frame adapted for wheeling movements over sod, a shaft, bearing means mounting said shaft to said frame in a horizontal position for rotation with respect thereto, means for selectively rotating said shaft with respect to said frame alternately in opposite directions between two positions, a cylindrical ground-engaging drum-like member journalled on said shaft concentrically therewith for rotation with respect thereto, said drum-like member being rotated during wheeling movements of the frame, a plurality of tubular digger elements, means connecting said digger elements to an end wall of said drum-like member in circumferentially spaced relationship for rotation therewith and for rotation with respect thereto, and gearing between said shaft and said digger elements whereby at one position of said shaft said digger elements are maintained in operative vertical positions during rotation of said drum-like member and at the other position of said shaft said digger elements are maintained in inoperative positions angularly disposed to their operative positions during rotation of said drum-like member.

2. The structure defined in claim 1 in which said means for selectively rotating said shaft comprises a lever pivotally connected intermediate its ends to said frame for pivotal swinging movements about a horizontal axis, and means connecting said lever to said shaft for rotating said shaft on pivotal movements of said lever.

3. The structure defined in claim 2 in which said last-mentioned means comprises a sprocket fixedly secured to said shaft, and a chain running over said sprocket and having its opposite ends secured to said lever on opposite sides of the pivotal axis thereof.

4. In a machine for cutting sod plugs, a wheeled frame adapted for wheeling movements over sod, a shaft, bearing means mounting said shaft to said frame in a horizontal position for rotation with respect thereto, means for selectively rotating said shaft with respect to said frame alternately in opposite directions between two positions, a cylindrical ground-engaging drum-like member journalled on said shaft concentrically therewith for rotation with respect thereto, said drum-like member being rotated during wheeling movements of the frame, a plurality of tubular digger elements, means connecting said digger elements to an end wall of said drum-like member in circumferentially spaced relationship for rotation therewith and for rotation with respect thereto, a plurality of piston and plunger rod assemblies each mounted in a different one of said digger elements for limited axial movements therein alternately in opposite directions with the plunger thereof being movable between an extended position and a retracted position, an ejector mechanism consecutively engaging each of said plungers when the latter is disposed adjacent the peak of its path of travel about the axis of said drum-like member during the rotation of said drum-like member for consecutively moving said plungers from their extended to their retracted positions, and gearing between said shaft and said digger elements whereby at one position of said shaft said digger elements are maintained in operative vertical positions during rotation of said drum-like member and at the other position of said shaft said digger elements are maintained in inoperative positions angularly disposed to their operative positions during rotation of said drum-like member.

5. In a machine for cutting sod plugs, a wheeled frame adapted for wheeling movements over sod, a shaft, bearing means mounting said shaft to said frame in a horizontal position for rotation with respect thereto, means for selectively rotating said shaft with respect to said frame alternately in opposite directions between two positions, a cylindrical ground-engaging drum-like member journalled on said shaft concentrically therewith for rotation with respect thereto, said drum-like member being rotated during wheeling movements of the frame, a plurality of tubular digger elements, a plurality of digger shafts each connected with a different one of said digger elements and extending laterally outwardly therefrom generally at right angles to the axis thereof, said digger shafts being journalled in an end wall of said drum-like member radially inwardly from the periphery thereof a distance less than the axial distance between the outer ends of said digger elements and said digger shafts and disposed in circumferentially spaced relationship for rotation with said drum-like member and for rotation with respect thereto, a plurality of piston and plunger assemblies, means mounting each of said assemblies in a different one of said digger elements for limited axial reciprocatory movements therewith with the plungers of said assemblies being movable between extended and retracted positions, and gearing between said shaft and said digger elements whereby at one position of said shaft said digger elements are maintained in operative vertical positions during rotation of said drum-like member and at the other position of said shaft said digger elements are maintained in inoperative generally horizontal positions during rotation of said drum-like member.

6. The structure defined in claim 5 in further combination with an ejector mechanism comprising a generally upright mounting member rigid with said frame, a generally horizontally disposed ejector arm pivotally connected intermediate its ends to said mounting member for pivotally swinging movements about a horizontal axis, one end of said ejector arm overlying the path of travel of said plungers at a place adjacent the peak thereof and being periodically generally vertically reciprocally movable between a potential sod-ejecting position and an effectuated sod-ejecting position wherein during generally vertically downward movements thereof from its former position to its latter position the said one end of said ejector arm engages one of said plungers and moves it from its extended position to its retracted position, resilient means yieldably urging said ejector arm to its potential sod-ejecting position, and actuating means for periodically moving said ejector arm from its potential sod-ejecting position to its effectuated sod-ejecting position as each plunger passes adjacent the peak of its path of travel about the axis of said drum-like member.

7. The structure defined in claim 6 in further combination with a chute rigidly connected to said shaft adjacent one end thereof radially inwardly of said digger elements and at the position of said shaft wherein said digger elements are vertically disposed defining an upwardly opening downwardly sloping channel for receiving the ejected sod plugs and directing them to the ground.

8. The structure defined in claim 7 in which said actuating means comprises a control arm having an upright portion pivotally connected adjacent its upper end to the other end of said ejector arm and having its lower end flexibly connected to said frame for vertical movements with respect thereto and for limited pivotal movements about its pivotal connection to said ejector arm, other resilient means urging the lower end of the upright portion of said control arm toward the path of travel of said digger elements to its limit of pivotal movement in that direction, said lower end defining an abutment disposed in the path of travel of said digger elements at said limit and successively engaged by the heads thereof for periodic generally vertically upward movements of said control arm during the rotation of said drum-like member.

9. In a machine for cutting sod plugs, a wheeled frame adapted for wheeling movements over sod, a shaft, bearing means mounting said shaft to said frame in a horizontal position for rotation with respect thereto, means for selectively rotating said shaft with respect to said frame alternately in opposite directions between two positions, a cylindrical ground-engaging drum-like member journalled on said shaft concentrically therewith for rotation with respect thereto, said drum-like member being rotated during wheeling movements of the frame, a plurality of tubular digger elements, a plurality of heads each in fixed relationship with a different one of said tubular elements at one end thereof, a plurality of digger shafts each rigidly connected to a different one of said heads and extending laterally outwardly therefrom generally at right angles to the axis of the associated digger element, said digger shafts being journalled in an end wall of said drum-like member radially inwardly from the periphery thereof a distance less than the axial distance between said digger shafts and the ends of said digger elements which are opposite said heads and being disposed in uniformly circumferentially spaced relationship for rotation with said drum-like member and for rotation with respect thereto, and gearing comprising a plurality of digger gears each rigidly anchored to a different one of said digger shafts adjacent the ends thereof on the opposite side of said end wall of the drum-like member from said digger elements, a shaft gear rigidly anchored to said shaft in radially inwardly disposed relationship with said digger gears and in generally common planes therewith, and several intermediate gears connected to said drum-like member for rotation with respect thereto about horizontal axes in circumferentially spaced relationship radially inwardly of said digger shafts and being in mesh with said shaft gear and said digger gears whereby at one position of said shaft said digger elements are maintained in operative vertical positions during rotation of said drum-like member and at the other position of said shaft said digger elements are maintained in inoperative generally horizontal positions during rotation of said drum-like member.

10. The structure defined in claim 9 in which said means for selectively rotating said shaft comprises a lever pivotally connected intermediate its ends to said frame for pivotal swinging movements about a horizontal axis, a sprocket fixedly secured to said shaft, and a chain running over said sprocket and having its opposite ends secured to said lever on opposite sides of the pivotal axis thereof.

11. The structure defined in claim 10 in further combination with a plurality of piston and plunger assemblies, means mounting each of said assemblies in a different one of said digger elements for limited axial reciprocatory movements therein with the plungers of said assemblies being movable between extended and retracted positions, and an ejector mechanism comprising a generally upright mounting member rigid with said frame, a generally horizontally disposed ejector arm pivotally connected intermediate its ends to said mounting member for pivotal swinging movements about a horizontal axis, one end of said ejector arm overlying the path of travel of said plungers at a place adjacent the peak thereof and being periodically generally vertically reciprocally movable between a potential sod-ejecting position and an effectuated sod-ejecting position wherein during generally vertically downward movements thereof from its former position to its latter position the said one end of said ejector arm engages one of said plungers and moves it from its extended position to its retracted position, resilient means yieldably urging said ejector arm to its potential sod-ejecting position, and actuating means for periodically moving said ejector arm from its potential sod-ejecting position to its effectuated sod-ejecting position as each plunger passes adjacent the peak of its path of travel about the axis of said drum-like member.

12. The structure defined in claim 11 in further combination with a chute rigidly connected to said shaft adjacent one end thereof radially inwardly of said digger elements and at the position of said shaft wherein said digger elements are vertically disposed defining an upwardly opening downwardly sloping channel for receiving the ejected sod plugs and directing them to the ground.

13. The structure defined in claim 12 in which said actuating means comprises a control arm having an upright portion pivotally connected adjacent its upper end to the other end of said ejector arm and having its lower end flexibly connected to said frame for vertical movements with respect thereto and for limited pivotal movements about its pivotal connection to said ejector arm, other resilient means urging the lower end of the upright portion of said control arm toward the path of travel of said digger elements to its limit of pivotal movement in that direction, said lower end defining an abutment disposed in the path of travel of said digger elements at said limit and successively engaged by the heads thereof for periodic generally vertically upward movements of said control arm during the rotation of said drum-like member.

References Cited in the file of this patent

UNITED STATES PATENTS

| | | |
|---|---|---|
| 1,207,310 | MacGregor | Dec. 5, 1916 |
| 1,874,768 | Lewis | Aug. 30, 1932 |
| 2,041,182 | Hume et al. | May 19, 1936 |
| 2,041,208 | Rienks | May 19, 1936 |
| 2,088,209 | Nolte | July 27, 1937 |
| 2,700,926 | Goit | Feb. 1, 1955 |

FOREIGN PATENTS

| | | |
|---|---|---|
| 82,705 | Norway | Nov. 2, 1953 |